March 4, 1924.

J. J. MILLER

SUPPLEMENTAL GRAIN DOOR FOR FREIGHT CARS

Filed Sept. 5, 1922   2 Sheets-Sheet 1

1,485,866

Inventor:
John J. Miller
By Mason, Fenwick and Lawrence
Attys.

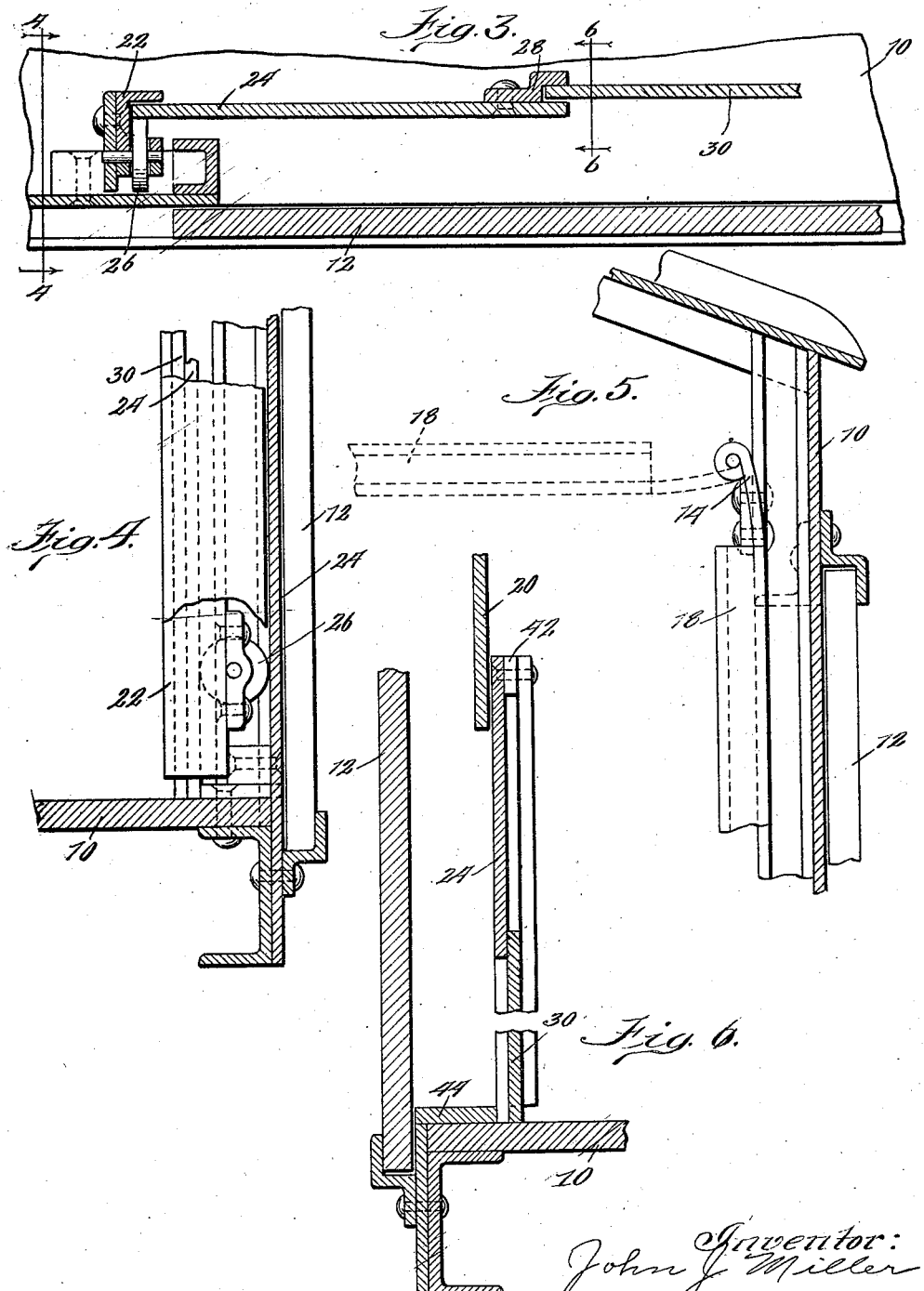

Patented Mar. 4, 1924.

1,485,866

UNITED STATES PATENT OFFICE.

JOHN J. MILLER, OF CHICAGO, ILLINOIS.

SUPPLEMENTAL GRAIN DOOR FOR FREIGHT CARS.

Application filed September 5, 1922. Serial No. 586,335.

*To all whom it may concern:*

Be it known that I, JOHN J. MILLER, a citizen of the United States, residing at 600 W. Erie Street, Chicago, in the county of Cook and State of Illinois, have invented certain new and useful Improvements in Supplemental Grain Doors for Freight Cars; and I do hereby declare the following to be a full, clear, and exact description of the invention, such as will enable others skilled in the art to which it appertains to make and use the same.

This invention relates to improvements in a door construction on freight cars, used in handling grains, and has for its particular object the provision of a grain door for freight cars which can be readily applied to practically any railroad freight car, which will immediately and conveniently transform the same into a car in which small grains, any loose material or the like may be more economically handled and shipped than at present.

One of the important objects of this invention is the provision of an inner grain door for freight cars which shall be so constructed that the pressure of the grain against the door from the inside can be gradually lessened whenever it is desired to unload the car, thereby overcoming one of the great disadvantages which are now met with in the handling of grain in ordinary freight cars as now and heretofore constructed.

Another important object of this invention is the provision of an inner grain door adapted to be applied to freight cars and which shall render the cars especially applicable for handling small grains or the like, which door is composed of a plurality of sections of different sizes, which open in succession, whereby the removal of the grain from the car can be accomplished readily and efficiently by first unloading a small portion of the grain through one of the smaller sections of the door, which can be more easily opened, and then by successively opening additional sections the pressure will gradually be diminished on the door until the same can be opened easily and to its full extent, thereby facilitating the unloading of the grain or similar material from the car.

Still another important object of this invention is the provision of an inner grain door which can be readily applied to freight cars of ordinary construction and which, when not in use, can be stored away in a very small and out of the way space at the top of the car, from whence it can be readily withdrawn when desired.

Another and further important object of this invention is the provision of an inner grain door for freight cars which will supplement the ordinary door on cars of present construction and which in normal operating position shall be placed behind the outside door on the car and therefore inaccessible when the outside door is locked, thereby positively preventing any unauthorized tampering with the contents of the car.

Other and further important objects of the invention will be apparent from the disclosures in the accompanying drawings and following specification.

The invention, in a preferred form, is illustrated in the drawings and hereinafter more fully described.

In the drawings:

Fig. 3 is a detail section taken on the line 3—3 of Fig. 2, looking in the direction indicated by the arrows.

Fig. 4 is a vertical section taken on the line 4—4 of Fig. 3.

Fig. 5 is a vertical section taken approximately on the line 5—5 of Fig. 2.

Fig. 6 is a sectional view on the line 6—6 of Fig. 3, looking in the direction indicated by the arrows.

As shown in the drawings:

Figure 1:
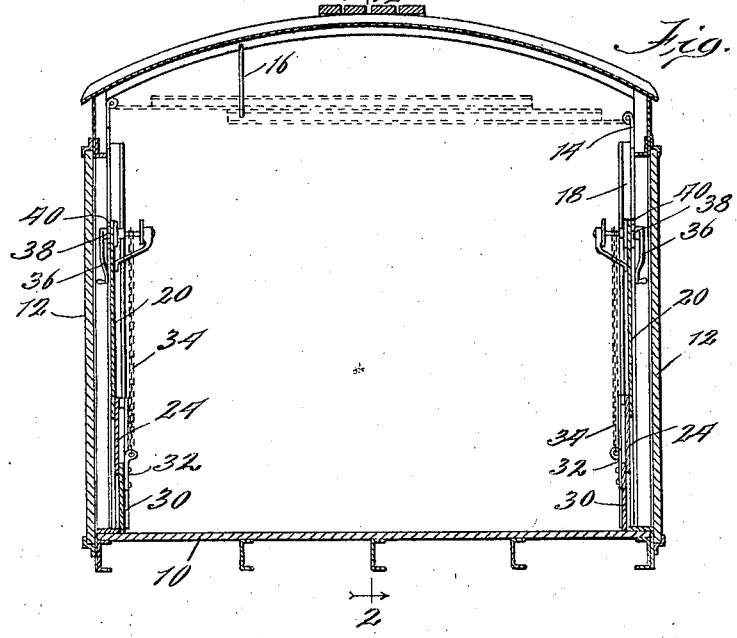
Fig. 1 is a vertical transverse section of a freight car having the improved grain doors of this invention applied thereto.
Figure 2:
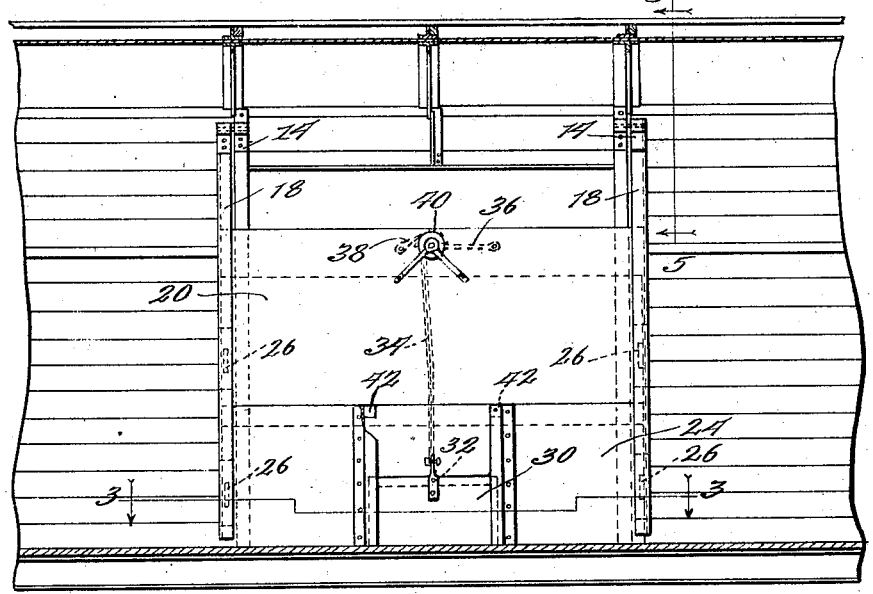
Fig. 2 is a vertical section taken at right angles to Fig. 1 on the line 2—2 of Fig. 1, and looking at the door from the inside, as indicated by the arrows.

The reference numeral 10 indicates in a general way a freight car of ordinary construction having outer doors 12 applied thereto.

Adapted to be fitted into operative position immediately behind the doors 12 are the improved grain holding doors of this invention, which, as shown in the drawings, are hinged, as at 14, to the top portion of the car so that they may be dropped down into operative position, and when not in use, may be readily swung up on the hinges 14 to the top of the car, and secured thereto by means of hooks 16, or the like. The doors proper comprise two parallel side frame bars 18, as shown, which are preferably of metal, and have attached thereto and adapted to extend across the open door of the car, planks, or the like, as at 20, forming the main portion of the door. The planks 20 do not extend throughout the entire height of the bars 18, so that an open space is provided between the top of said planks 20 and the lintel of the car door opening, which space is for purposes of loading the car and for ventilation, inspection and the like.

The bars 18, or at least the lower portions thereof, are made in a channel or U-shape, as best shown at 22 in Fig. 3, and adapted to slide therein is a transversely extending plank or gate member 24, which extends entirely across the opening of the car, and is adapted to operate against rollers or the like 26, positioned on shafts or bearings in the channel member 22, the rollers 26 being provided to reduce friction and also to provide for a more efficient means of operation of the door 24 when the same is being pulled up against the pressure of any grain in the car which may be piled against the gate from the inside.

Slidably positioned in suitable channels 28, mounted on the door or gate 24 is a smaller door 30 which covers an opening approximately one-sixth of the size of the larger sliding door 24, and is adapted to be first opened in the operation of the improved device of this invention. Attached to the door 30 by means of a plate 32 or the like, bolted thereon, is a chain or rope member 34, the upper end of which is adapted to be wound around a drum or spindle forming part of a windlass 36, provided with a pawl 38 and ratchet 40, whereby any retrograde or downward movement of the gates can be prevented, as desired. Stops 42 are provided in the upper part of the channel 28 on the large door 24 against which the upper edge of the smaller gate 30 is adapted to abut upon reaching a predetermined limit of its movement, and after which any further operation of the windlass 36 and the chain 34 will serve to draw upwardly both the small gate 30 and the large gate 24, in the U-shaped channels or grooves 22 of the bars 18.

A sill or the like 44 is provided, fastened in position across the opening of the car door, against which the bottom edge of the sliding door 24 is adapted to abut when in normal position, and be thereby maintained securely in place, and eliminating any possibility of its being pushed out, by the weight or pressure of the grain upon the gate from the inside.

The operation is as follows:

Whenever it is desired to use a freight car with the improved device of this invention applied thereto, the grain doors can be dropped upon the hinges 14 from their inoperative position at the top of the car by unfastening the hooks 16, whereupon the doors will then automatically drop into desired position. The car can then be loaded with grain or similar material through the open space provided between the top of the door portion 20 and the lintel of the car door proper, the outer door 12, of course, being left open for this purpose. When the loading of the car is completed, which is approximately up to the level of the windlass 36, or slightly below, the outer doors 12 are closed and sealed, which practically prevents any tampering with the contents of the car. Any convenient loading means may be used.

When the car has arrived at its destination, or when it is to be unloaded, the outer doors 12 are opened and pushed back, and the grain chute, or other delivery means, positioned adjacent the lower small door 30, after which the windlass 36 is operated, raising the door 30 sufficiently to allow of a flow therethrough of a quantity of the grain or other material. Any convenient lifting means may be used. This flow through the small opening relieves considerable of the pressure existing on the door members 20, 24 and 30, and after some portion of the grain has been withdrawn in this manner, the windlass 36 may be further operated to draw upwardly the larger door 24, which will slide in the grooves or channels 22. Thereby the entire door may be swung up to its inoperative position adjacent the roof, and at the same time a larger grain delivery means may be inserted into position in connection with the door of the car 10.

It will be obvious that herein is provided a simple, complete and efficient door which makes for economy and convenience in the loading, and means for unloading of grain from cars, the operation of which is free from any of the many difficulties which have heretofore been experienced in such work, due to the labor involved in the building of inner wooden doors on every occasion, and the inconvenience in removing all doors now in use because of their method of attachment and the pressure exerted upon the inner face of doors or boards which are ordinarily used in grain cars.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. In an inner grain door for freight cars, the combination of a hinged frame, a door panel fixed to said hinged frame, additional panels on said frame, adapted to be slidably operated thereon, and means for operating said slidable door panels, said means comprising a windlass and chain mounted on the relatively fixed panel.

2. In a supplemental grain door for freight cars, the combination of a hinged frame, a door panel fixed to said hinged frame, additional panels on said frame, adapted to be slidably operated thereon, means carried by said fixed door panel for operating said slidable door panels, said means comprising a windlass and chain, and means comprising a pawl and ratchet in connection with said windlass and chain whereby retrograde downward movement of the sliding doors is prevented.

3. In an inner grain door for freight cars, the combination of a frame hinged to the top of the car, a door panel fixed to said hinged frame, additional panels on said frame, adapted to be slidably operated thereon, and means for maintaining said door in inoperative position, said means including a hook mounted in the top of the car, and adapted to support the door when the same is swung up out of operative position.

4. In an inner grain door for freight cars, the combination of a hinged body, a door panel fixed to said hinged body, additional panels on said body adapted to be slidably operated thereon, means for operating said slidable door panels, said means comprising a windlass and chain, and stops for limiting the movement of one of said sliding panels with respect to the other sliding panel, which stops further comprise means for operating said other slidable panel.

In testimony whereof I affix my signature.

JOHN J. MILLER.